United States Patent

[11] 3,607,027

| [72] | Inventor | Gothe Oscar Westerlund<br>Vancouver, British Columbia, Canada |
|---|---|---|
| [21] | Appl. No. | 32,280 |
| [22] | Filed | Apr. 27, 1970 |
| [45] | Patented | Sept. 21, 1971 |
| [73] | Assignee | Chemech Engineering Ltd.<br>Vancouver, British Columbia, Canada |
| [32] | Priority | May 20, 1967 |
| [33] | | Canada |
| [31] | | 991,055 |
| | | Continuation-in-part of application Ser. No.<br>657,803, Aug. 2, 1967, now abandoned. |

[54] PROCESS FOR PREPARING CHLORINE DIOXIDE
9 Claims, 1 Drawing Fig.

[52] U.S. Cl. ............................................. 23/152,
23/154, 23/156, 23/219
[51] Int. Cl. .............................................. C01b 11/02,
C01b 7/02
[50] Field of Search................................. 23/152,
154, 156, 219

[56] References Cited
UNITED STATES PATENTS

| 1,563,732 | 12/1925 | Egleson ...................... | 23/154 X |
| 1,831,474 | 11/1931 | Ayres, Jr. ...................... | 23/154 |
| 2,366,670 | 1/1945 | Maude ...................... | 23/156 |
| 2,436,432 | 2/1948 | Hunter ...................... | 23/154 |
| 2,444,256 | 6/1948 | Hill ...................... | 23/156 |
| 2,484,402 | 10/1949 | Day et al. ...................... | 23/152 |
| 2,605,168 | 7/1952 | Wagner ...................... | 23/152 |
| 2,736,636 | 2/1956 | Day et al. ...................... | 23/152 |
| 2,861,871 | 11/1958 | Germano ...................... | 23/152 |
| 3,058,808 | 10/1962 | Ernest ...................... | 23/152 |
| 3,101,253 | 8/1963 | Hirschberg ...................... | 23/152 |
| 3,322,497 | 5/1967 | Martin ...................... | 23/152 |
| 3,404,952 | 10/1968 | Westerlund ...................... | 23/152 |
| 3,516,790 | 6/1970 | Westerlund ...................... | 23/152 |

Primary Examiner—Edward Stern
Attorney—Fred Philpitt

ABSTRACT: An improved process for preparing chlorine dioxide is provided wherein the bulk of the reactants are internally produced.

The reactants include an aqueous solution of an inorganic chlorate and aqueous hydrochloric acid. The aqueous solution of the inorganic chlorate is produced by electrolyzing an aqueous solution of an inorganic chloride.

The aqueous hydrochloric acid is produced from hydrogen gas, which is a byproduct of the electrolysis reaction by which the inorganic chloride is converted to the inorganic chlorate, and chlorine gas. The chlorine gas is produced as follows:

In reacting the aqueous inorganic chlorate with the aqueous hydrochloric acid, both gaseous chlorine dioxide and chlorine are formed. The gaseous chlorine is separated from the gaseous chlorine dioxide.

A portion of the so-separated gaseous chlorine is reacted with the heretofore produced hydrogen to form gaseous hydrogen chloride. The gaseous hydrogen chloride is used as a reactant, either by dissolving it in a stoichiometrically insufficient quantity of water, thereby to provide an aqueous solution of hydrochloric acid and free hydrogen chloride gas, or by dissolving it in water containing absorbed chlorine gas.

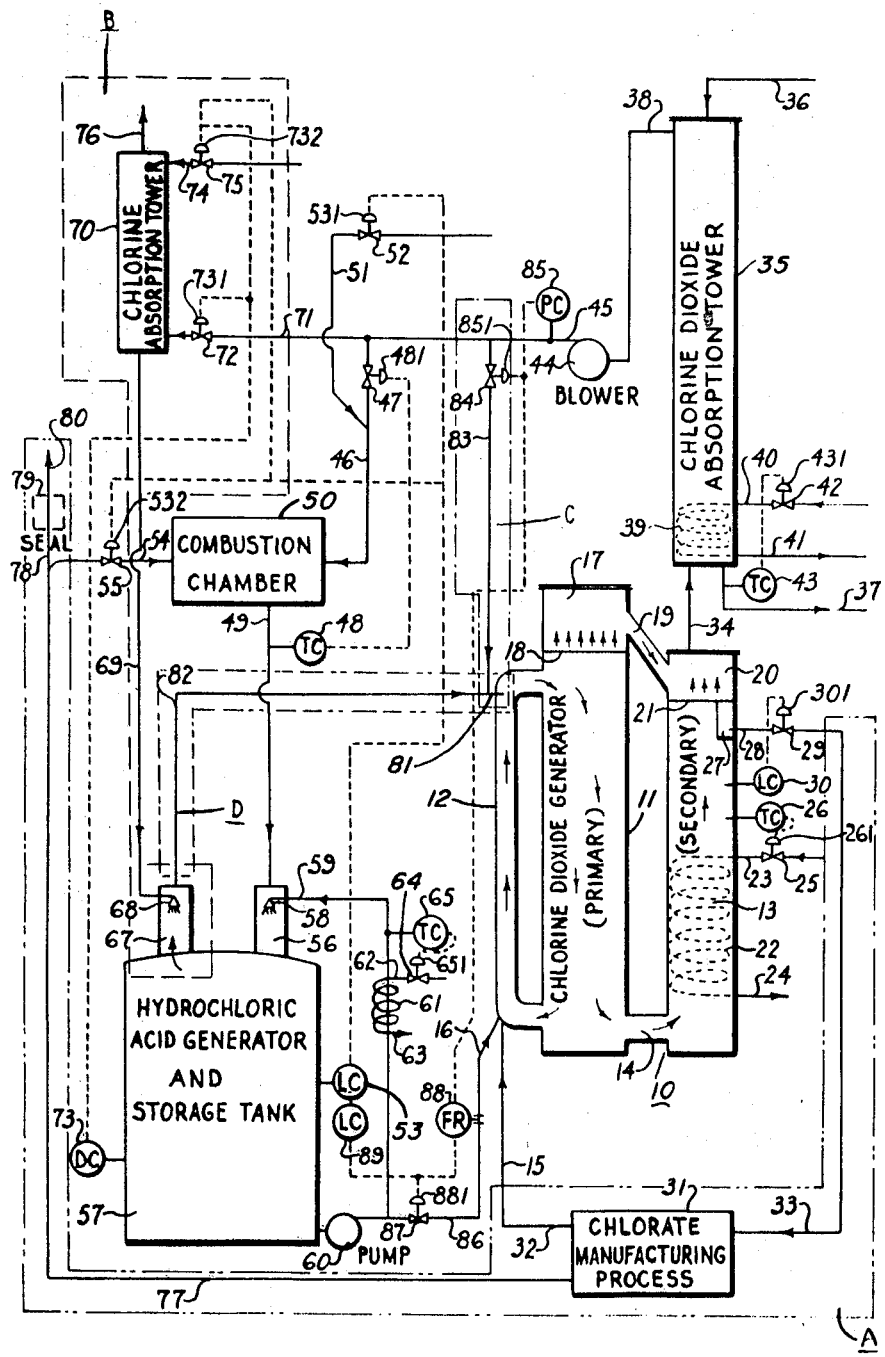

PROCESS FOR PREPARING CHLORINE DIOXIDE

RELATED APPLICATIONS

This application is a continuation-in-part of application Ser. No. 657,803 filed Aug. 2, 1967 (now abandoned).

BACKGROUND OF THE INVENTION

1. Field of the Invention

This invention relates to an improved closed loop process for the preparation of chlorine dioxide and of reactants used therein. It also relates to apparatus for carrying out such closed loop process.

2. Description of the Prior Art

Chlorine dioxide has been prepared in the past by treating chlorates with sulfuric acid or with mixtures of sulfuric acid and an organic reducing agent, such as oxalic acid. However, it has been found that such processes are, in general, uneconomical, hazardous and wasteful.

It was also known that hydrochloric acid and chloric acid may be reacted to produce gaseous mixtures of chlorine dioxide and chlorine. In practice these reactions are carried out by treating aqueous mixtures of water-soluble chlorates and chlorides, such as may be obtained, for example, by chlorinating lime or by the electrolysis of salt, with an excess of a strong acid, for example, hydrochloric acid of sulfuric acid. The reaction above referred to may be represented by the following equations:

(1) $2NaClO_3 + 4HCl \rightarrow 2ClO_2 + Cl_2 + 2NaCl + 2H_2O$
(2) $2NaClO_3 + 12HCl \rightleftharpoons 6Cl_2 + 2NaCl + 6H_2O$ Ordinarily, reaction (2) is predominant over reaction (1) and consequently the yield in chlorine dioxide is correspondingly low.

An effort to overcome the difficulties in low yield of chlorine dioxide was suggested in Canadian Pat. No. 461,586 issued Dec. 6, 1949 to George A. Day and Edward F. Fenn. In general, that invention involved reacting solutions of chlorates with hydrochloric acid, the acid being supplied to an amount substantially less than the equivalent stoichiometric ratio 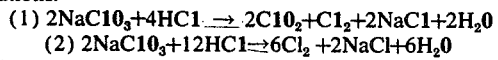 of reaction (1), thereby decomposing at any one time only a fraction of the available chlorate, so that the decomposition proceeds at a particularly rapid rate. The chlorate content of the partially spent solution is enriched, as by feeding it to an electrolytic chlorate cell, and returning the fortified solution to the reaction chamber to treat it again with a stoichiometrically insufficient amount of acid. The above-described cycle is then repeated so that substantially all the chlorate supplied is eventually efficiently decomposed, producing mixtures of chlorine dioxide and chlorine containing high proportions of chlorine dioxide.

The patentees state that they prefer to use, as starting materials, concentrated solutions rich in chlorate. It is easily possible to prepare electrolytic cell liquors containing over 40 percent by weight of salts, and mol ratios of sodium chlorate to sodium chloride of the order of 4 to 1. By using such solutions rich in chlorate, the patentees state they make available for decomposition at any one time large amounts of chlorate without undue waste of space in the reaction chamber. They also teach that they increase the rate of reaction (1) which, of course, proceeds more rapidly with higher concentrations of the reactants.

The patentees also state that they prefer to use hydrochloric acid to react with the chlorate because the chloride ion takes part in the reaction and therefore is spent without appreciably contaminating the partially depleted solution which is returned to the chlorate cell. The patentees also teach that while they may use aqueous hydrochloric acid, they prefer to use gaseous hydrogen chloride. The advantages alleged for the use of gaseous hydrogen chloride are that they avoid the progressive dilution of the recycled chlorate solution, which dilution would decrease the reaction rate, or would necessitate an added operation of evaporation to retain an efficient output per unit of equipment. The patentees also teach that it is convenient to introduce the gaseous hydrogen chloride into the reaction chamber in a current of air which also serves to sweep the chlorine dioxide—chlorine mixture from the reaction vessel.

Since chlorine dioxide is extremely explosive at high temperatures, the reactions described hereinabove have generally been carried out at relatively low temperatures. Furthermore, in order to reduce still further the danger of explosion, a nonreactive (inert) gas is conducted into the reaction vessel; the purpose of the gas is to reduce the concentration of chlorine dioxide in the vessel to a nonexplosive proportion.

Another proposal to overcome difficulties inherent in the above-referred to reactions was suggested in U.S. Pat. No. 2,664,341 issued Dec. 29, 1953 to Edelbert E. Kesting. The patentee proposes that the chlorate and hydrochloric acid solutions are caused to flow through a series of consecutive reaction vessels staggered in height, one behind the other, arranged either in the form of a cascade, or as a column. In the opposite direction, a stream of inert gas is forced or drawn through the reaction vessels. For example, air or nitrogen may be supplied in a stream to the series of reaction vessels, the purpose being to flush out the chlorine dioxide produced in the individual vessels, and to carry it along, at the same time diluting it to nondangerous concentrations.

The inert gas is caused to flow through the liquid by means of gas inlet pipes extending to the bottom of the vessels. The uppermost vessel is adjusted to the lowest temperature, while the lowermost vessel has the highest temperature. Under these conditions, the current of gas flowing through the apparatus has the lowest concentration of chlorine in the vessel having the highest temperature, while the chlorine dioxide concentration increases in the vessels above the lowermost. Thus, the temperature becomes lower with the concentration of chlorine dioxide increasing, i.e. the highest chlorine dioxide concentration is obtained in the uppermost vessel where the temperature is lowest.

In processes where gaseous hydrogen chloride is used or where large amounts of inert gases are used, there is need for a rather large compressor. The need for such compressor involves increased capital and operating costs.

SUMMARY OF THE INVENTION

Aims of the Invention

An object of one broad aspect of this invention is the provision of an improved process for preparing chlorine dioxide from an aqueous solution of an inorganic chlorate by the use of a reducing agent including an aqueous solution of hydrochloric acid.

An object of another aspect of this invention is the provision of a process for preparing chlorine dioxide in which the reactants are provided by an electrolytic chlorate cell.

An object of a variant of that aspect of this invention is the provision of an improved process for producing chlorine dioxide in which byproduct chlorine is used for the production of the reducing agent.

An object of yet another variant of that aspect of this invention is the provision of an improved process for producing chlorine dioxide in which the off-gases from the electrolytic chlorate cell are used as a source of hydrogen gas for the reaction to form HCl.

Broad Statements of the Invention

By an aspect of the present invention, there is provided, in the known process for producing chlorine dioxide by the reaction of hydrogen chloride with an aqueous solution of an inorganic chlorate, the improvement which comprises: (a) carrying out the electrolysis of an aqueous solution of an inorganic chloride in an electrolytic cell thereby to provide (1) effluent liquor comprising an aqueous solution of an inorganic chloride ad an inorganic chlorate and (2) cell-off gases which contain hydrogen, oxygen, chlorine, water vapor, and which may also contain carbon dioxide; (b) conducting the effluent liquor to a reaction zone and either reacting it simultaneously with an aqueous solution of hydrochloric acid and gaseous hydrogen chloride, or reacting it with an aqueous hydrochloric acid solution formed by dissolving hydrogen chloride gas in water containing absorbed chlorine gas; (c) removing from the reaction zone gases having a composition within the range of 3–92%$Cl_2$, 5–15%$ClO_2$, 0–60%$CO_2$ and 3–50%$H_2O$; (d) recycling the effluent liquor from the reaction zone to the electrolytic cell as feed for the electrolysis reaction; (e) treating the gases of step (c) so as to separate the chlorine gas from the chlorine dioxide gas; (f) reacting a portion of the chlorine gas separated in step (e) with hydrogen gas whereby to form hydrogen chloride gas; (g) dissolving the hydrogen chloride with water to form an aqueous solution of hydrochloric acid; and (h) employing the hydrochloric acid produced in step (g) in step (b).

By one embodiment of this aspect of this invention, the amount of water used to dissolve the hydrogen chloride gas in step (g) is insufficient to dissolve all the hydrogen chloride, whereby hydrogen chloride gas is also used as reactant in step (b).

By another embodiment of this aspect of this invention, a portion of the water which is used in dissolving the hydrogen chloride is in the form of a chlorine-water solution which results when a portion of the chlorine gas formed in step (a) is absorbed in water, this water also serving to separate the chlorine reactant gas from carbon dioxide byproduct.

By another embodiment of this aspect of this invention, a portion of the water which is used in dissolving hydrogen chloride is in the form of recycled solution of aqueous hydrochloric acid.

By another embodiment of this aspect of the present invention, the cell-off gases from the electrolysis reaction in step (a) are used as the source of hydrogen gas for the reaction in step (f).

By another embodiment of this aspect of the present invention, the cell-off gases consist of hydrogen, oxygen, chlorine, carbon dioxide and water vapor and are used as a source of both chlorine gas and hydrogen gas for the reaction in step (f) to form hydrogen chloride.

DESCRIPTION OF THE DRAWINGS

The accompanying drawing is a schematic flow sheet showing a system according to broad aspects of the present invention, including blocks A, B, C, and D which represent various embodiments and aspects of this invention.

DETAILED DESCRIPTION

Referring to the drawing, reference numeral 10 designates generally a chlorine dioxide generator. This may be a conventional enclosed reaction vessel but preferably is the chlorine dioxide generator disclosed and claimed in Canadian application Ser. No. 969,582. It includes an enclosed primary chamber 11, a recirculating leg 12 and an enclosed secondary chamber 13 connected thereto by liquor-connecting leg 14. The lower portion of the recirculating leg 12 is provided with a chlorate inlet line 15 and a hydrochloric acid inlet line 16. Reaction gases accumulate at the upper reaches 17 of the enclosed primary chamber 13 to provide a gas-liquid interface 18. The gas in the upper gas zone 17 is swept to the secondary chamber 13 through gas chute 19, and provides a secondary gas zone 20 having a gas-liquor interface 21.

The enclosed secondary chamber 13 is provided with a heat exchanger 22 disposed in the lower portion thereof. The heat exchanger 22 includes steam inlet line 23 and condensate outlet line 24. Stream inlet line 23 is provided with a valve 25 controlled by a servo 261 operated by a temperature control 26 provided with conventional temperature responsive means disposed in secondary chamber 13.

Reaction liquor discharges from secondary chamber 13 by passing over overflow weir 27 to effluent line 28. Effluent line 28 is provided with a valve 29 controlled by a servo 301 operated by a level sensing control 30 provided with conventional level-sensing means disposed in secondary chamber 13.

One preferred aspect of this invention involves using an electrolytic chlorate cell generally indicated by reference numeral 31 as the source of chlorate. The essential components of this aspect of this invention are bounded by the broken lines of the block A. While any electrolytic cell may be used, it is preferred to use the cell covered by Canadian Pat. No. 741,778. The cell 31 includes a reaction liquor effluent line 32 linked to the chlorate inlet line 15 and a reactant liquor inlet line 33 linked to the effluent line 29. The cell also includes a cell gas outlet line 77, whose interconnections will be described in detail hereinafter.

The chlorine dioxide generator 10 is provided with a reaction gas outlet line 34, which leads to a chlorine dioxide absorption tower 35. The chlorine dioxide reaction gas is composed of chlorine, chlorine dioxide, carbon dioxide and water vapor, which may be in approximately the following ranges of proportions: 3–92% $Cl_2$; 5–15% $ClO_2$; 0–60% $CO_2$; and 3–50% $H_2O$. The chlorine dioxide absorption tower 35 includes an upper dissolving water inlet line 36, a lower aqueous chlorine dioxide solution effluent line 37 and an upper gas outlet line 38. The gas emerging from the chlorine dioxide absorption tower is composed of chlorine, carbon dioxide and water vapor, which may be in approximately the following ranges of proportions: 3–98% $Cl_2$; 0–60% $CO_2$; and 1–6% $H_2O$.

The chlorine dioxide absorption tower 35 is provided, at its lower end, with a cooling coil 39 provided with a cooling water inlet line 40 and a cooling water outlet line 41. The amount of cooling water passing through cooling coil 39 is regulated by a valve 42 operated by a servo 431 controlled by a temperature control 43, provided with conventional temperature-sensing means within aqueous chlorine dioxide solution effluent line 37.

Disposed in chlorine dioxide absorption tower gas outlet line 38 is a blower 44 which propels the gas through a main gas line 45. Connected to the main gas line 34 is a chlorine gas stream inlet line 46 leading to a combustion chamber 50. Chlorine gas stream inlet line 46 is provided with a valve 47 operated by a servo 481 controlled by a temperature control 48, provided with conventional temperature-sensing means within product gas outlet line 49 of combustion chamber 50.

For the purpose of startup and for periods of time when the amount of chlorine gas is low, a chlorine makeup line 51 is provided which connects to chlorine gas stream inlet line 46. The amount of chlorine fed through makeup line 51 is controlled by valve 52 which is operated by a servo 531 whose operation is controlled by a level control 53 to be described in further detail hereinafter.

The combustion chamber 50 is also provided with hydrogen gas inlet line 54, the amount of hydrogen admitted being controlled by valve 55, operated by servo 532, controlled by the level controller 53 to be described in greater detail hereinafter.

The effluent from the combustion chamber 50 is led via a product gas outlet line 49 to the primary scrubber and cooler 56 of a hydrochloric acid generator and storage tank 57. The composition of the gas in line 49 is hydrogen chloride vapor, chlorine gas, carbon dioxide and water vapor, usually in the following ranges of proportions: 30–95% HCl; 1–60% $Cl_2$; 0–60% $CO_2$; and 2–12% $H_2O$. In the primary scrubber and cooler 56 the gas is washed with a temperature-controlled aqueous hydrochloric acid solution emerging through nozzles 58 from recycle line 59. The aqueous hydrochloric acid solution is pumped by pump 60 from near the bottom of the hydrochloric acid generator and storage tank 57 via line 59 past a temperature-controlling cooling coil 61. Cooling coil 61 is provided with cooling water inlet line 62 and water outlet line 63. The amount of water fed through cooling water inlet line 62 is controlled by valve 64 which is operated by servo 651 controlled by a temperature control 65 provided with conventional temperature-sensing means within the cycle line 59.

In another embodiment of this invention shown bounded by the broken lines of block D, the residual or tail gases passing upwardly from within the hydrochloric acid production and storage tank 57 are led to a secondary scrubber and cooler 67. In the secondary scrubber and cooler 67, such gases are washed by a chlorine-water solution emerging through nozzle 68 fed by chlorine-water solution line 69.

The chlorine-water solution is provided by a chlorine absorption tower system which is another embodiment of this invention and shown bounded by the broken lines of block B. Chlorine absorption tower 70 is fed with chlorine-containing gas, namely a gas consisting of chlorine, carbon dioxide and water vapor, via secondary chlorine gas stream line 71 which is attached to main gas line 45. The secondary chlorine gas stream line 71 is provided with a valve 72 used to control the flow of chlorine. The flow of chlorine is controlled by the valve 72 which is operated by a servo 731 controlled by density control 73 provided with conventional density sensing devices within the lower portion of the hydrochloric acid generator and storage tank 57. Wash water to the chlorine absorption tower 70 is provided through water inlet line 74. The amount of water admitted through water inlet line 74 is controlled by valve 75 which is operated by servo 732, controlled both by density control 73, by temperature control 48 and by level control 53. The water-insoluble carbon dioxide is vented through a discharge vent 76.

In another preferred embodiment of this invention, the hydrogen used as reactant in combustion chamber 50 is provided by the cell gases resulting from the electrolytic production of chlorate in a chlorate cell. Particularly preferred for use is the chlorate cell disclosed in Canadian Pat. No. 741,748. The cell gases which consist of hydrogen, oxygen, water vapor, carbon dioxide and chlorine which may be in the following approximate ranges of composition: 86–93% $H_2$; 3–4% $O_2$; 3–6% $H_2O$; 0.5–2% $CO_2$; and 0.5–2% $Cl_2$, are led by cell gas line 77 to valve 55 where it is admitted to combustion chamber 50. A bypass line 78 is also provided for cell gas line 77. This bypass line 78 discharges a controlled excess of gases through a seal 79 to be vented by outlet vent 80.

In accordance with yet another preferred embodiment of the present invention shown in the drawing as being bounded by the broken lines of block D, diluent and reactant gas is introduced into the chlorine dioxide generator at a location close to the liquid-gas interface 18. The gas may be admitted through gas inlet line 81. Gas inlet line 81 is fed by primary diluent and reactant gas line 82 which feeds the residual or tail gases from the hydrochloric acid production and storage tank 57 %$CO_2$ primary diluent and reactant line 82 to gas inlet line 81. The composition of the primary diluent and reactant gas is chlorine, hydrogen chloride, carbon dioxide and water vapor, which may be in approximately the following ranges of composition: up to 97%$Cl_2$; up to 10% HCl; up to 60%$CO_2$; and 2–8%$H_2O$. Hydrogen chloride, being a reactant gas in the diluent gas, greater efficiency of the process results. In addition, gas inlet line 81 may also be fed by secondary gas line 83 which brings such gas from main gas line 45. This represents yet another aspect of this invention and is shown in the drawing as bounded by the broken lines of block C. The flow of gas through secondary gas line 83 is controlled by valve 84 which is operated by servo 851 which is controlled by a pressure control 85 provided with conventional pressure-sensing means in main gas line 45.

Aqueous hydrochloric acid solution is pumped from the hydrochloric acid generator and storage tank 57 by means of pump 60 through line 86 which communicates with hydrochloric acid inlet line 16. The flow of the hydrochloric acid through line 86 is controlled by valve 87 which is operated by servo 881. Servo 881 is controlled by a flow rator 88, as well as by a low liquid level gauge 89. The flow rator is provided with conventional flow-sensing means in hydrochloric acid line 86, and the low liquid level gauge 89 is provided with conventional liquid-level-sensing means in hydrochloric acid generator and storage tank 57.

The following additional points should be noted with respect to the various controls of the process. The temperature controller 48 is interlocked with the recirculation of gases from the chlorine dioxide tower. The density of the hydrochloric acid produced in the hydrochloric acid generator and storage tank is regulated by the addition of chlorine water solution which is controlled by a density control 73 which, in turn, controls the amount of water admitted to the chlorine absorption tower 70. It is to be noted, however, that a minimum flow is required of the water which minimum flow will be in proportion to the production of hydrochloric acid and to the gas flow. It is also to be observed that the makeup of chlorine gas admitted in line 51 is controlled by the liquor control 53 provided with suitable sensing means within hydrochloric acid generator and storage tank 57.

The low level control gauge 89 is for the purpose of ensuring that the tank 57 is not pumped empty when the hydrochloric acid is used as one of the reactants.

The secondary chamber 13 of the chlorine dioxide generator 10 is provided both with a temperature control 26 and a level control 30. The temperature is normally above 50° C. but below the boiling point of the liquor, namely between 105° and 109° C. By means of the level control 30 and the temperature control 26 the water balance in the system is controlled. At a higher temperature the vapor pressure of water increases, resulting in water evaporation from the generator liquor. Temperatures may thus be raised as high as the boiling point of the liquor, and this elevated temperature will drive the reaction in the generator still further.

The temperature control 43 is for the purpose of controlling the ratio of chlorine gas to chlorine dioxide gas which is dissolved in the water. At lower temperatures the ratio of chlorine gas to chlorine dioxide gas increases.

The temperature control in the combustion chamber bypass provides for higher temperatures in the combustion chamber, as well as providing means for removing water from the generator liquor. A higher rate of diluent gas generally tends to increase the removal of water from the generator liquor.

In general terms, the procedure of aspects of this invention may be summarized as follows:

The chlorate process cell gases are used as feed for the combustion chamber, and the amount of gases so fed are controlled by a temperature controller which is also interlocked with the recirculation of gases from the chlorine dioxide absorption tower. While chlorate cell gases are a preferred source of hydrogen, the hydrogen may come from other sources, e.g. pure hydrogen or from a chlorine-alkali cell. The products of the combustion chamber are scrubbed and cooled before entering the hydrochloric acid generator and storage tank. Thus, condensed water saturated with hydrochloric acid is discharged into the tank. Uncondensed or undissolved gases will pass upwardly through a second scrubber which uses chlorine-water as a scrubbing agent. The density of the hydrochloric acid is regulated by the chlorine-water addition, but it is noted that a minimum flow of water is required, which flow is proportional to the production of HCl and the gas flow. The gases will further decrease in temperature, more hydrochloric acid will go into solution, and some chlorine will be stripped from the chlorine-water and will pass out with other insoluble gases to the generator. The gaseous HCl in such gas stream will also react with the chlorate and consequently, will be fully utilized. The makeup of chlorine is controlled by the liquor level in the hydrochloric acid generator and storage tank.

The aqueous hydrochloric acid solution is pumped into the bottom of the generator, flow being controlled by a flow rator. This feed is interlocked with a low level control on the tank to ensure that the tank is not pumped empty.

Also fed to the generator is a chlorate solution which is fed to the chlorate process as a weaker chlorate solution after it is reacted in the generator. A temperature control and a liquid level control are used in the generator Gases leave the generator and are transferred to the absorption tower.

Water is added to the tower to maintain the desired concentration of chlorine dioxide in the chlorine dioxide solution.

Gases leaving the tower are mainly chlorine, carbon dioxide (whose proportion is dependent on the amount in the cell gases and the bleed from the system) and some water vapor.

A blower provided with a pressure controller regulates pressure throughout the system.

The process system requires a makeup of chlorine which is regulated by the requirement of reducing agent which is, in turn, controlled by a level controller 53 provided in the hydrochloric acid generator and storage tank 57.

The amount of makeup chlorine is theoretically calculated by the following overall summarized reaction for the aspect of the invention including the electrolytic production of chlorates: $4H_2O + Cl_2 + 12 \text{ Faradays} \rightarrow 2ClO_2 + 4H_2$ The system yields up to 95 percent efficiency. It is thus noted that the only byproducts are a small amount of cell gases and some carbon dioxide. The process yields as the main product an aqueous chlorine dioxide solution.

By following aspects of the present invention, the following procedure and system is provided, namely:

A self-contained system is provided which only requires chlorine, water and electric power after the initial chargeup of brine makeup.

A process is provided which produces chlorine and chlorine dioxide in which the chlorine is internally recirculated in the system for the makeup of reducing agent.

A process is provided which uses chlorine and water vapor (and carbon dioxide if an electrolytic cell is used to produce the hydrogen) as a diluent for the generator gases to minimize explosion hazards.

A closed system process is provided which employs chlorine as a makeup for the production of the reducing agent used in converting sodium chlorate to chlorine dioxide and chlorine.

A closed system is provided which uses hydrogen in the cell gases from the electrolytic process for producing chlorates for combustion in a chlorine atmosphere. Since the system also burns oxygen, the system also provides for the removal of carbon dioxide which otherwise would accumulate.

A closed system is provided which uses chlorine also present in the cell gases from the electrolytic process for producing chlorates as part of the chlorine used to produce the reducing agent.

A process and system is provided which vents the hydrochloric acid generator and storage tank to the generator, and consequently which utilizes hydrogen chloride gas for reduction of the chlorates to chlorine dioxide and chlorine, thereby realizing further economic benefits.

A process and system is provided which feeds the diluent gases to the generator near the interface of the liquor and gas, thus minimizing the pressure drop through the generator, thereby making possible the use of less costly blowers instead of the conventionally used compressors for such diluent gases.

The invention also provides storage facilities for HCl reducing agent in the form of an aqueous solution. Consequently, the system may be operated even when the chlorate process and/or the combustion chamber are shut down. It is also possible to facilitate adequate storage for chlorate liquor, thereby making it unnecessary to maintain excessive chlorine dioxide solution storage.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. In the known process for producing chlorine dioxide by the reaction of hydrogen chloride with an aqueous solution of an inorganic chlorate, the improvement which comprises:
   a. carrying out the electrolysis of an aqueous solution of an inorganic chloride in an electrolytic cell thereby to provide
      2. effluent liquor comprising an aqueous solution of an inorganic chloride and an inorganic chlorate, and
      2. cell-off gases which contain hydrogen, oxygen, chlorine, water vapor, and which may also contain carbon dioxide;
   b. conducting said effluent liquor to a reaction zone and either reacting it simultaneously with an aqueous solution of hydrochloric acid and gaseous hydrogen chloride, or reacting it with an aqueous hydrochloric acid solution formed by dissolving hydrogen chloride gas in water containing absorbed chlorine gas;
   c. removing from said reaction zone gases having a composition within the range of:
      $3-p\% Cl_2$
      $5-15\% ClO_2$
      $0-60\% CO_2$ and
      $3-50\% H_2O$
   d. recycling the effluent liquor from said reaction zone to said electrolytic cell as feed for said electrolysis reaction;
   e. treating the gases of step (c) so as to separate the chlorine gas from the chlorine dioxide gas;
   f. reacting a portion of the chlorine gas separated in step (e) with hydrogen gas whereby to form hydrogen chloride gas;
   g. dissolving the hydrogen chloride with water to form an aqueous solution of hydrochloric acid; and
   h. employing the hydrochloric acid produced in step (g) in step (b).

2. The process of claim 1 wherein said hydrogen chloride used in step (b) is prepared by dissolving the hydrogen chloride gas of step (g) in a stoichiometrically insufficient quantity of water, thereby to provide an aqueous solution of hydrochloric acid and free hydrogen chloride gas.

3. The process of claim 1 wherein a portion of the water which is used in dissolving the hydrogen chloride in step (g) is in the form of a chlorine-water solution which results when a portion of chlorine gas formed in step (a) is absorbed in water.

4. The process of claim 1 wherein a portion of the water which is used in dissolving the hydrogen chloride in step (g) is in the form of a recycled aqueous solution of hydrochloric acid.

5. The process of claim 1 wherein the cell-off gases from the electrolysis reaction of step (a) are used as a source of hydrogen gas for the reaction in step (f) to form hydrogen chloride.

6. The process of claim 1 wherein the cell-off gases are used as a source of both chlorine gas and hydrogen gas for the reaction in step (f) to form hydrogen chloride.

7. The process of claim 1 wherein the treatment in step (e) comprises contacting the gases with water, thereby to absorb chlorine gas in said water.

8. The process of claim 1 wherein the composition of the separated chlorine gas reacted in step (e) is:
   $3-98\% Cl_2$
   $0-60\% CO_2$ and
   $1-6\% H_2O$.

9. The process of claim 1 wherein the hydrogen chloride gas produced in step (f) has the composition:
   $30-95\%$ HCl HCl
   $1-60\% Cl_2$
   $0-60\% CO_2$ and
   $2-12\% H_2O$.